J. A. SWEET.
METHOD OF AND APPARATUS FOR MANUFACTURING HOLLOW GLASS BODIES.
APPLICATION FILED SEPT. 24, 1909.
1,007,503.
Patented Oct. 31, 1911.
2 SHEETS—SHEET 1.
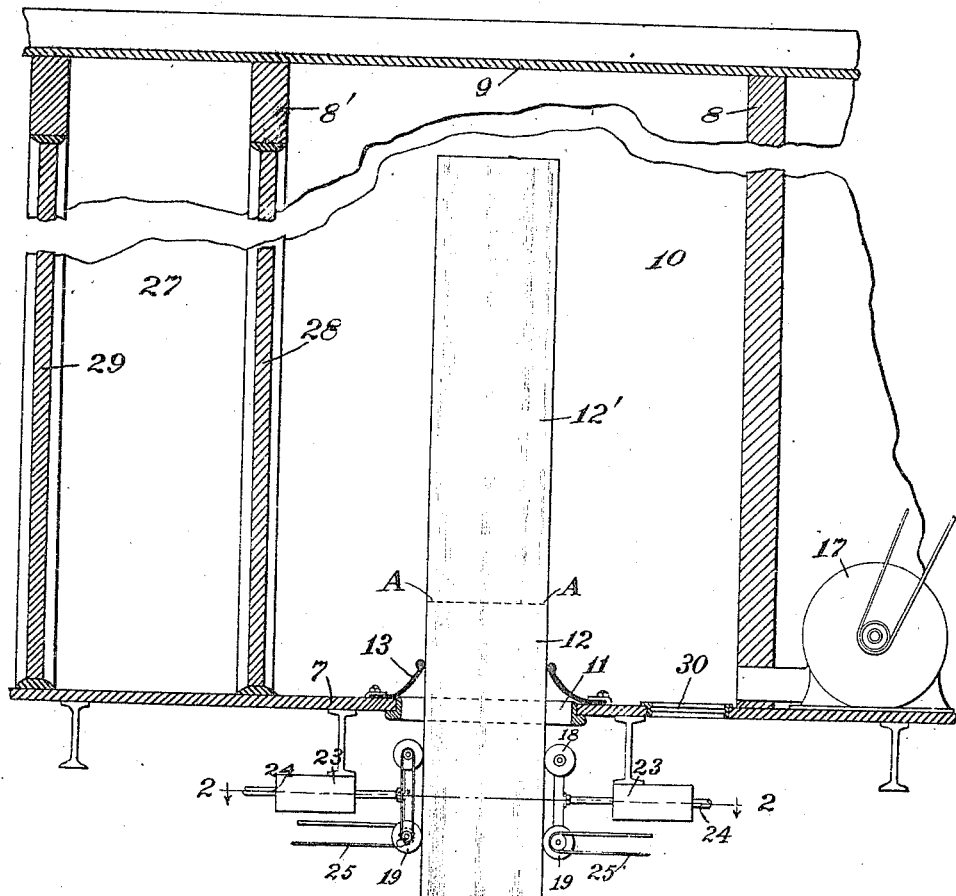
Fig. 1.
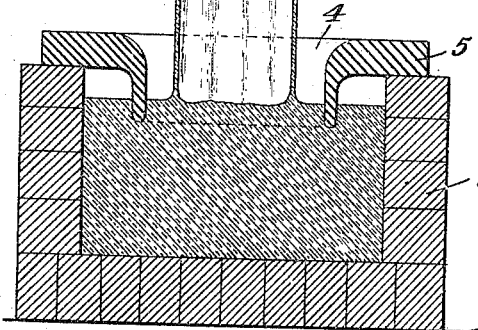

J. A. SWEET.
METHOD OF AND APPARATUS FOR MANUFACTURING HOLLOW GLASS BODIES.
APPLICATION FILED SEPT. 24, 1909.
1,007,503.
Patented Oct. 31, 1911.
2 SHEETS—SHEET 2.
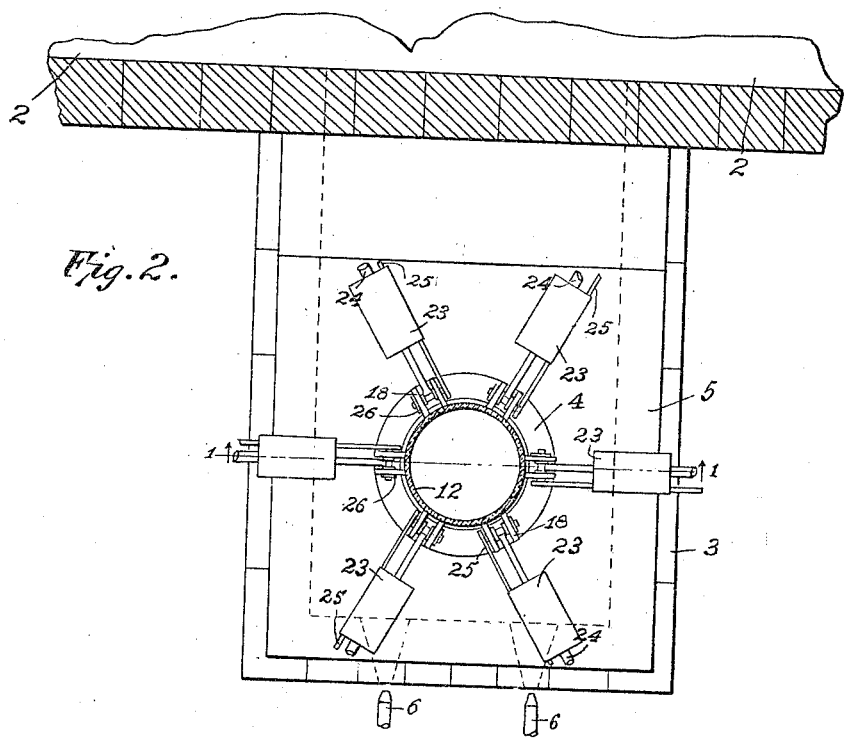
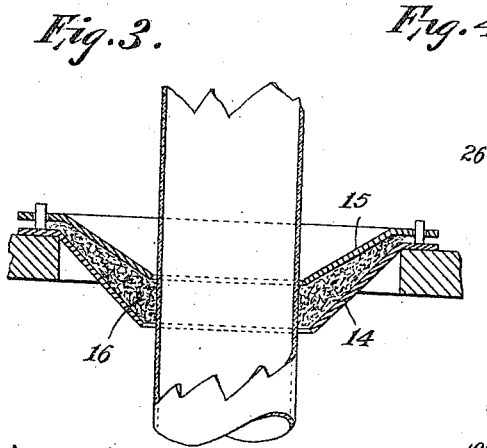
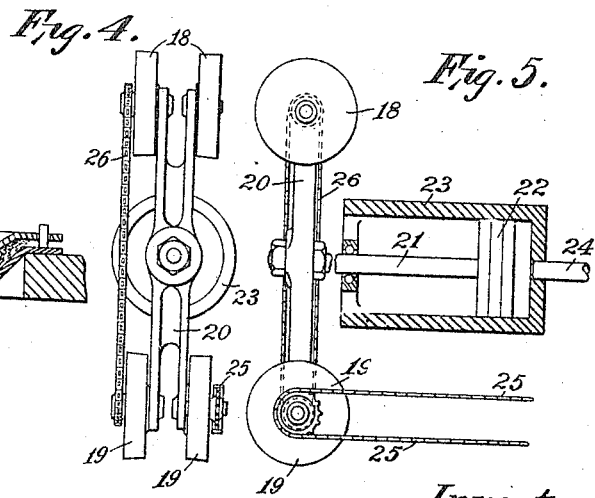

UNITED STATES PATENT OFFICE.

JOHN A. SWEET, OF HARTFORD CITY, INDIANA.

METHOD OF AND APPARATUS FOR MANUFACTURING HOLLOW GLASS BODIES.

1,007,503.

Specification of Letters Patent. Patented Oct. 31, 1911.

Application filed September 24, 1909. Serial No. 519,312.

*To all whom it may concern:*

Be it known that I, JOHN A. SWEET, a resident of Hartford City, in the county of Blackford and State of Indiana, have invented certain new and useful Improvements in Methods of and Apparatus for Manufacturing Hollow Glass Bodies, of which the following is a specification.

In the manufacture of hollow glass bodies, particularly cylinders for window glass, there has been considerable development along the lines of mechanical drawing as distinguished from manual blowing, the hollow body forming progressively as it is drawn or otherwise extended from a molten glass container, with mechanical blowing means substituted for the human blower to maintain air under sufficient pressure within the body to prevent decrease in diameter, and to extend the blown body longitudinally. Under the present practice, the bait or starting device is usually smaller than the cylinder to be drawn, and after a sufficient amount of glass has accumulated thereon such glass is expanded by air under pressure admitted through the blow pipe until the desired diameter of the body or cylinder is secured. And in the subsequent drawing this diameter is maintained by air under pressure from the blow pipe. Thus, blowing, as such, occurs only when starting the blank, and the air subsequently admitted merely maintains that diameter as the drawing process proceeds, preventing diminution of diameter due to the tendency of the glass, under the drawing operation, to form in a column smaller than the cylinder as started. It is necessary to maintain such a ratio of the pressures within and without the body as will secure a uniform diameter, preventing collapse on the one hand, and distention on the other. In the absence of these conditions, an irregular body would result which obviously would destroy its utility, particularly for window glass or other sheet purposes. The present invention recognizes these fundamental essentials, but applies them in such way as to maintain a highly efficient ratio between the interior and exterior air pressures without interrupting the formation of the body or cylinder, so that in this sense the forming operation is continuous, the cylinder being cut into requisite lengths beyond the drawing means.

A characteristic of the invention is the omission of the usual bait and bait-moving means, together with the maintaining of free communication between the interior of the formed body and a compartment into which the body is extended, provision being had for maintaining air within such compartment at a pressure sufficiently above atmospheric pressure to maintain the diameter of cylinder. In furtherance of this development, I provide means which engages the exterior of the body or cylinder for moving it progressively into the compartment, the body forming continuously from the molten glass as such movement proceeds.

The invention also includes means for sealing the compartment where the body or cylinder enters, the sealing means engaging the body and preventing the escape of air without impeding the inward movement of the body and without marring its surface.

The entire length of the cylinder interior is in free communication with the chamber into which it is drawn, and the use of devices for confining or for localizing air within the cylinder is entirely avoided. This is of material advantage. It is not practicable to confine the air by means located within the cylinder beneath its upper end for the reason that there are unavoidable variations in the diameter of the cylinder which prevent such means from being effective. And with air confining means located at the upper end, such as the familiar bell-like bait through which the air is usually admitted, continuous drawing is precluded. By maintaining the requisite air pressure in a chamber into which the cylinder is drawn with the entire length of the cylinder interior freely open to the chamber, the drawing of cylinders of prime quality may proceed without interruption. As the body or cylinder of column form is projected into the compartment it is cut or severed into suitable lengths and these lengths may be removed in any convenient manner. The mode here proposed includes a second compartment adapted to communicate with the first compartment and also with the outer air, so that the severed lengths may be moved thereinto and from thence to the outer air without materially affecting the air pressure in the first compartment.

Still a further feature of the invention is the employment of a previously formed glass cylinder, open at its ends and of a length sufficient to extend from the molten glass, through the lifting or drawing means and the seal, and into the compartment of higher air pressure, the lower extremity of this starting cylinder section serving as a bait and drawing the glass in continuation thereof as the operation proceeds.

A form of apparatus for practicing the invention is illustrated by the accompanying drawings, Figure 1 being a view in section of the compartments and the extension of a furnace tank from which glass is drawn, the section being on line 1—1 of Fig. 2. Fig. 2 is a top plan on line 2—2 of Fig. 1. Fig. 3 illustrates a seal of modified form. Figs. 4 and 5 are details of portions of the cylinder-moving mechanism.

Referring to the drawings, 2 designates a portion of a tank furnace, and 3 a neck-like extension thereof from which the glass is drawn through an opening 4 in cover 5. The outer portion of neck or extension 3 may be heated by burners 6 so that all of the glass within extension 3 is maintained at uniform temperature. While a tank of this general character may comprise the molten glass container, the glass may be variously held for drawing without departing from the invention.

Above the glass container is an inclosed structure, consisting of floor 7, side walls 8, 8' and ceiling or roof 9, 10 indicating the compartment thus inclosed. An opening 11 is formed through floor 7 in line vertically with top opening 4 of the container for the passage of the hollow glass body or cylinder 12. As the air within the compartment 10 is maintained slightly above atmospheric pressure, as will presently appear, it is necessary to provide a seal at opening 11 around the cylinder to prevent the escape of air from compartment 10 without impeding the movement of the cylinder and without marring its outer surface. In Fig. 1 the seal is shown consisting of a flexible diaphragm 13 which may be formed of rubber, asbestos, or other suitable material, the same projecting upwardly or inwardly into compartment 10 in such manner that the pressure of air therein will tend to hold the seal in engagement with the glass. In the form of seal shown in Fig. 3, the passage for the cylinder is through a downwardly dished body 14, and held compressed therein by a weight or follower 15 is a mass 16 of feathers, asbestos fiber, saw-dust, or other suitable material of a compressible nature which, owing to the shape of holder 14 and weight 15, is pressed outwardly around the surface of the glass, thereby forming the requisite seal. Whether of the form shown in Fig. 1, or that of Fig. 3, the seal adjusts itself to any slight variations or irregularities that may occur in the diameter of the cylinder.

The air within compartment 10 is maintained with a pressure slightly higher than that of the atmosphere, and with the upper end of the glass cylinder fully open, such air fills the cylinder and resists collapsing tendency. This air pressure may be variously maintained, a means here shown being a rotary blower or pump 17 in communication with the compartment.

The column-like body or cylinder may be advanced progressively into compartment 10 by various means. That here shown consists of a plurality of sets or rollers engaging the outer face of the glass and positioned beneath the floor 7. Each of the roll sets consists of upper rollers 18 and lower rollers 19, each journaled on a vertical carrier 20, the carrier, in turn, being secured to rod 21 of piston 22 working in horizontal cylinder 23, the outer end of the cylinder having an air or other pressure medium inlet 24. The means here shown for driving the rollers consists of a belt or chain 25 extending to the spindle of lower roller 19, with a like belt or chain 26 connecting the spindles of the lower and upper rollers. Thus, all the rollers are positively driven, and they are held in engagement with the glass under such pressure on piston 22 as is necessary to insure the movement of the cylinder.

The cylinder-forming operation may be started in any way that will result in a hollow or cylindrical glass body extending from the molten glass container, through the lifting rollers, and through the seal. A desirable way of thus starting the operation is to employ a previously formed glass cylinder of suitable length, open at its ends, with its lower end entered in the molten glass and its upper end projected into compartment 10. The upper portion of the column shown in Fig. 1, down to line A—A, and indicated by numeral 12', may designate such a starting blank or cylinder. The glass will adhere to the lower extremity of this bait-forming cylinder and will continue to form in like manner as the cylinder is drawn upward, the newly formed body or cylinder thus soon extending from the glass container to the compartment.

Compartment 10 may be of any suitable height, so that the formed cylinder may be projected above the entrance as far as desired to produce a blank or section of requisite length, the latter being cut from the ascending column above the entrance by any suitable cutting or cracking-off means, this without interrupting the communication between the column and the interior of the compartment 10, so that the column is held distended and there is no collapsing tendency.

The sections into which the column is cut may be removed in any manner that will not seriously affect the air pressure within compartment 10. One way of accomplishing this is by the use of a second compartment 27 having a door 28 communicating with compartment 10, and another door 29 opening into the atmosphere. The sections may be first taken into compartment 27, and then with door 28 closed they may be removed through the door 29 without seriously disturbing the air pressure in compartment 10. A window 30 may be placed in floor 7 through which the operator within said compartment may observe the glass as it is drawn from the container.

I claim:—

1. The method of producing hollow glass bodies consisting in maintaining a zone of air at a distance from the molten glass under higher pressure than atmospheric pressure with a zone of air at atmospheric pressure intermediate the zone of higher pressure and the molten glass, drawing a hollow body from the molten glass through the zone of air at atmospheric pressure and into the zone of higher pressure with the interior of the body and that portion of the surface of the molten glass inclosed by the body exposed to the air of higher pressure.

2. The method of producing hollow glass bodies consisting in drawing a hollow body from molten glass into a zone of air under higher pressure than atmospheric pressure with the air of higher pressure in communication with the interior of the body.

3. The method of producing hollow glass bodies consisting in drawing an open-end hollow body from a molten bath, maintaining a zone of air under pressure with the entire length of the body interior and a portion of the length of its exterior downwardly from its open upper end subjected to the air under pressure, and with the remainder of the body exterior exposed to air at atmospheric pressure.

4. The method of producing a hollow glass body consisting in maintaining a zone of air under higher pressure than atmospheric pressure drawing a hollow body from the molten glass into said zone and moving the same thereinto progressively as the body continues to form from the molten glass with the interior of the body and the molten glass inclosed by the forming extremity of the body in free communication with the zone of higher pressure.

5. The method of producing a hollow glass body consisting in maintaining molten glass in a zone of air at atmospheric pressure, maintaining a zone of air in proximity to the molten glass at a pressure higher than atmosphere, drawing a hollow body from the molten glass into the zone of higher pressure and moving the body progressively into said zone as the hollow body continues to form from the molten glass with the interior of said body in free communication with said zone of higher pressure.

6. The method of producing a hollow glass body consisting in maintaining molten glass in a zone of air at atmospheric pressure, maintaining a zone of air in proximity to the molten glass at a pressure higher than atmosphere, drawing a hollow body from the molten glass into the zone of higher pressure and moving the body progressively into said zone as the hollow body continues to form from the molten glass, maintaining an air seal where the body enters the zone of higher pressure and moving the body through said seal with the interior of the body in free communication with the zone of higher pressure.

7. The method of producing hollow glass bodies consisting in maintaining a zone of air under higher pressure than the air at the molten glass, entering a previously formed hollow body in the molten glass and in the zone of higher pressure with the interior of said hollow body in communication with the air of higher pressure, and moving said body and the continuation thereof drawn from the molten glass progressively into said zone of higher pressure.

8. The method of producing hollow glass bodies consisting in moving a body of hollow glass progressively into an air zone of higher pressure than atmospheric pressure with the interior of the body in communication with the zone of higher pressure, and cutting the formed body into lengths within the zone of higher pressure.

9. Apparatus for manufacturing hollow glass bodies, comprising a molten glass container, a compartment in proximity to the container having an entrance for a glass body moved thereinto from the container, a flexible seal at the entrance engaging the glass body and preventing air from escaping from the compartment, and means for maintaining the air within the compartment above atmospheric pressure.

10. Apparatus for manufacturing hollow glass bodies, comprising a molten glass container, a compartment with means for maintaining air within the compartment above atmospheric pressure, means for extending a hollow glass body progressively from the container into the compartment, an air seal for the compartment where the body enters, a second compartment, and means for establishing communication between the latter and the first mentioned compartment and between the second compartment and the atmosphere.

11. Apparatus for manufacturing hollow glass bodies comprising a molten glass container, a compartment in proximity to the container having an entrance for an open-end glass body drawn thereinto from the container, means sealing the entrance around the glass body, body drawing means, and means for maintaining air within said compartment and within the body being drawn at higher pressure than the air at the exterior of the forming end of the body.

12. Apparatus for manufacturing hollow glass bodies comprising a molten glass container, a compartment having an entrance for an open-end glass body, means for maintaining air within said compartment and within the body being drawn at higher pressure than the air at the exterior of the forming end of the body, and means located between the said compartment and the container for moving the glass body into the said compartment.

In testimony whereof I affix my signature in presence of two witnesses.

JOHN A. SWEET.

Witnesses:
F. E. GAITHER,
J. M. NESBIT.